United States Patent
Steins

(10) Patent No.: US 7,407,533 B2
(45) Date of Patent: Aug. 5, 2008

(54) ACTIVE FILTER ELEMENT FOR END FACE INCIDENT FLOW

(75) Inventor: Oliver Steins, Waldsee (DE)

(73) Assignee: Mann & Hummel GmbH, Ludwigsburg (DE)

( * ) Notice: Subject to any disclaimer, the term of this patent is extended or adjusted under 35 U.S.C. 154(b) by 439 days.

(21) Appl. No.: 11/280,316

(22) Filed: Nov. 17, 2005

(65) Prior Publication Data

US 2006/0101999 A1 May 18, 2006

(30) Foreign Application Priority Data

Nov. 17, 2004 (DE) .................. 10 2004 000 050

(51) Int. Cl.
*B01D 53/04* (2006.01)
(52) U.S. Cl. .................. 96/134; 96/154; 55/385.3; 55/521; 210/492; 454/158
(58) Field of Classification Search .................. 96/134, 96/135, 154; 55/385.3, 512, 516–519, 521, 55/488; 210/493.1, 493.4, 492; 454/158
See application file for complete search history.

(56) References Cited

U.S. PATENT DOCUMENTS

| | | | | |
|---|---|---|---|---|
| 4,410,427 A * | 10/1983 | Wydeven | .................. | 210/317 |
| 4,418,662 A * | 12/1983 | Engler et al. | .................. | 96/133 |
| 4,917,862 A * | 4/1990 | Kraw et al. | .................. | 422/4 |
| 5,129,929 A * | 7/1992 | Linnersten | .................. | 96/117.5 |
| 5,354,365 A * | 10/1994 | Youn | .................. | 96/135 |
| 5,683,478 A * | 11/1997 | Anonychuk | .................. | 55/385.3 |
| 5,750,026 A * | 5/1998 | Gadkaree et al. | .................. | 210/502.1 |
| 6,348,086 B1 * | 2/2002 | Harms et al. | .................. | 96/125 |
| 6,352,578 B1 * | 3/2002 | Sakata et al. | .................. | 96/134 |
| 6,860,917 B2 * | 3/2005 | Henrichsen et al. | .................. | 55/523 |
| 6,953,124 B2 * | 10/2005 | Winter et al. | .................. | 210/445 |
| 7,128,772 B2 * | 10/2006 | Bruck | .................. | 55/385.3 |
| 7,326,280 B2 * | 2/2008 | Hrycak et al. | .................. | 96/108 |
| 2001/0035094 A1 * | 11/2001 | Takagaki et al. | .................. | 96/154 |
| 2005/0081712 A1 * | 4/2005 | Koslow | .................. | 95/90 |
| 2006/0042467 A1 * | 3/2006 | Maru | .................. | 96/134 |

FOREIGN PATENT DOCUMENTS

| | | |
|---|---|---|
| DE | 4432 339 A1 | 3/1996 |
| EP | 0 383 236 A1 | 8/1990 |
| JP | 2001-269523 A * | 10/2001 |

\* cited by examiner

*Primary Examiner*—Frank M Lawrence
(74) *Attorney, Agent, or Firm*—Crowell & Moring LLP

(57) ABSTRACT

A filter element formed from at least one flat layer of permeable filter medium alternating with at least one pleated layer in such a way that the resulting channels have an open, especially triangular, cross section, a first group of channels being tightly sealed at one end and a second group of channels being tightly sealed at the other end such that a fluid to be filtered flowing through the filter element from an incident flow side formed by one end face to a discharge side formed by the opposite end face, must pass through one of the layers, and at least one group of channels is filled with adsorbent particles and closed by a gas-permeable fabric disposed over the corresponding end face of the filter element, the fabric pores being smaller than the adsorbent particles.

15 Claims, 1 Drawing Sheet

ACTIVE FILTER ELEMENT FOR END FACE INCIDENT FLOW

BACKGROUND OF THE INVENTION

The invention relates to a filter element for end face incident flow in accordance with the species of claim 1. The invention further relates to a filter in which the described filter element is installed and to a method for producing a filter element of the foregoing type.

The passenger compartment filters currently used to adsorb harmful gases are flat filter elements consisting of highly porous plastic foams with activated carbon bonded thereto or several superimposed bonded activated carbon media. Also used are flat filter elements pleated in zigzag fashion with an activated carbon layer bonded to the filter medium.

Published European patent application no. EP 383,236 discloses a filter device with a flat carrier that is pleated in zigzag fashion. The flat carrier is gas permeable, since the gaseous medium to be filtered must penetrate the flat carrier. The adsorbent particles must be permanently bonded to the carrier material using a special process.

Published German patent application no. DE 44 32 339 discloses a passenger compartment filter with plate-shaped carrier layers assembled into a cuboid, such that the gas stream does not penetrate the carrier layers but only sweeps past them. This has the advantage that only a slight pressure loss occurs between the inflow and the discharge side. Here, too, however, the drawback is the need for a permanent bond between the carrier material and the adsorbent particles and the lack of a means to filter solid particles out of the gas stream. A further drawback in both solutions is that they require a lot of space, which is limited especially in the air supply to the passenger compartment of motor vehicles.

SUMMARY OF THE INVENTION

It is thus an object of the present invention to provide an improved filter element for filtering the air of a passenger compartment.

Another object of the invention is to provide an air filter element for a passenger compartment which avoids the aforementioned drawbacks.

A further object of the invention is to provide an air filter element which is simple and cost-effective to manufacture.

An additional object of the invention is to provide a filter which incorporates a filter element according to the invention.

It is also an object of the invention to provide a method for producing a filter element according to the invention.

These and other objects are achieved in accordance with the present invention by providing a filter element for end face incident flow comprising at least one flat layer of gas-permeable filter material alternating with at least one pleated layer of gas-permeable filter material to form channels having an open cross section, a first group of said channels being tightly sealed at one end and a second group of said channels being tightly sealed at an opposite end such that a fluid flowing through the filter from an incident flow side defined by one end face to a discharge side defined by an opposite end face must pass through one of said filter material layers to filter the fluid, and a seal for sealing the incident flow side from the discharge side at an installation site of the filter element, in which each side forming the open cross section of the channels of the first group which are spaced from the periphery of the filter element is bounded by a channel of the second group such that the fluid can flow through the full area of the channels of the first group, except for the fold edges of the channels; at least one group of channels is filled with adsorbent particles and sealed by a gas-permeable medium disposed over the corresponding end face of the filter element, and the particle size of the adsorbent material is larger than the pore size of the gas-permeable medium.

In accordance with a further aspect of the invention, the objects are also achieved by providing a method for producing a filter element, said method comprising alternately stacking at least one flat layer of fluid-permeable filter material and at least one pleated layer of fluid permeable filter material to form a plurality of parallel open channels; sealing a first group of channels at one end and a second group of channels at an opposite end, wherein each of the channels of the first group spaced from the periphery of the filter element is surrounded by channels of the second group; filling at least one group of channels with adsorbent particles, and covering the open ends of the filled channels with a fluid-permeable web having pores smaller than the adsorbent particles to hold the adsorbent particles in the filled channels.

The filter element according to the invention thus comprises at least one flat and one pleated layer. The pleated layer is comprised of a pleated filter medium, which preferably forms fold edges between the pleats but may also have a sinusoidal shape. If the filter element is configured as a wound filter, it is sufficient to provide one flat and one pleated layer, which are alternately wound. If the filter element is to be block-shaped, a plurality of filter layers (alternately flat and pleated) must be stacked on top of one another.

Furthermore, a seal for sealing the incident flow side from the discharge side must be provided at the installation site. The installation site may be a filter housing, for example. Another possibility is to use the filter element as an inline filter in a duct. The manner of installation may vary. It is feasible, for example, to permanently glue the filter element at the installation site. Another possibility is to design the filter element as a replaceable cartridge. In this case, seals, which separate the incident flow side from the discharge side of the filter, must be provided at the installation site or on the filter element.

Both flat and pleated layers of the filter element take part in the filtering process, i.e., they are made of a filter medium. The same or different filter media may be used. Moreover, at least in the interior of the filter element, i.e., spaced from the peripheral edge of the filter element, the channels are sealed such that discharge-side channels adjoin a given incident flow-side channel on all sides. Thus, all sides of the respective incident flow-side channel are active as filters. This makes it possible to maximize the contaminant retention capacity relative to the installed filter surface of the filter medium.

This effect is further enhanced by the fact that the preferably three sides of the respective channels are usable up to the corners formed by the fold edges of the filter medium. This can be explained by the triangular cross section, which unlike in the aforementioned wave-shaped intermediate layers does not result in areas in the filter medium that form such an acute angle that no measurable fluid stream occurs there. The cross section provided simultaneously minimizes the flow resistance of the filter element.

At the peripheral edge of the filter element, the condition that each incident flow-side channel should be bordered by a discharge-side channel can be realized only to a limited extent. The reason for this is that in the margin of the filter element there are incident flow-side channels that are no longer bordered by discharge-side channels, but by the edge of the filter element. Because of the geometry of the filter element, this limitation has to be accepted.

Furthermore, according to the invention, at least one group of channels is filled with adsorbent particles to adsorb harmful gases and odors from the air to be filtered. These adsorbent particles may be activated carbon particles, for example, such that the adsorbent particles are simply filled into the open channels of the filter element from the end face. Preferably, the channels are filled from the discharge-side of the filter element. To prevent the adsorbent particles from being carried away from the filter element during operation, at least the end face where the particles were introduced is covered by a gas-permeable medium, preferably a non-woven material, so that at least the individual channels containing the adsorbent particles are closed off relative to the environment. The pore size of the through pores of the gas-permeable medium is smaller than the particle size of the adsorbent particles. The resulting filter is simple and inexpensive to fabricate and can be used in a very space-saving manner in an inline arrangement inside a flow duct.

As described above, the filter element can be shaped into either a cylinder by rolling up the filter layers or a stack of a plurality of flat and pleated layers. The cylindrical filter element need not have the shape of a circular cylinder. For example elliptical shapes are also feasible. With stacked layers, it is possible to create not only cuboid filter elements but also stepped filter elements with staggered filter layers and spatially twisted structures. The wound filter elements may also be rolled into a cone, which corresponds to a stepped layering of cuboid filter elements. Thus, any cross-section of structures subject to flow can be filled almost completely by the filter medium. This makes it possible to optimally fill the available installation space.

In accordance with one specific embodiment of the invention, the channels of the filter element are disposed in such a way that six adjacent channels form a hexagonal cross section. In other words, the fold edges of two adjacent pleated layers, which are separated by a flat layer, converge in a line. This minimizes the amount of filter material that cannot be used for filtering. However, the condition that the incident flow-side channels should be bordered only by discharge-side channels is also met if two adjacent pleated layers of the filter element are offset. But in this case the side of the incident flow-side channels formed by the flat intermediate layer opens out into two discharge-side channels, which are separated by a fold edge of the pleated layer.

Another specific embodiment of the invention provides that the channels have a cross section of an equilateral triangle. In this case, the above-described advantages obtained in the flow through the filter cartridge are most pronounced. However, the folds of the pleated layers may also be pushed closer together or pulled further apart. This provides advantages in the packing density of the filter medium relative to the installation volume. The precise geometry of the filter cartridge with regard to the fold angles of the pleated layer must therefore be determined as a function of the individual case in order to achieve an optimal result.

The filter element can advantageously be provided with a filter frame for installation in a housing. The seal ensuring a reliable separation between the incident flow side and the discharge side can be mounted on this filter frame, for example. The filter frame can make the filter element more stable and makes it easier to replace the filter element.

The filter element may furthermore have a cover layer extending along the lateral faces between the discharge-side end face and the incident flow-side end face. This cover layer can be used as an additional seal or can form incident flow-side or discharge-side channels in the margin of the filter element. It may be made of the filter medium or of a different material, e.g., one that makes the cover layer impermeable to the fluid.

In accordance with yet another advantageous embodiment of the invention, the adsorbent particles are spherical activated carbon particles, which offer the advantage that their active surface is very large.

Preferably, the adsorbent particles are activated carbon chip particles, which are very inexpensive and which, because of their shape, ensure interior wedging of the particles and thus provide further security against any discharge from the filter element.

The invention also relates to a filter in which a filter cartridge as described above is installed.

The invention further relates to a method for producing a filter element according to the invention comprising the steps of manufacturing the "passive" filter element without the adsorbent particles, filling the resulting filter element with the adsorbent particles, and subsequently closing off the filled channels with a gas-permeable medium, such that the medium can be interconnected with the filter element either by a material connection or by a frictional connection.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
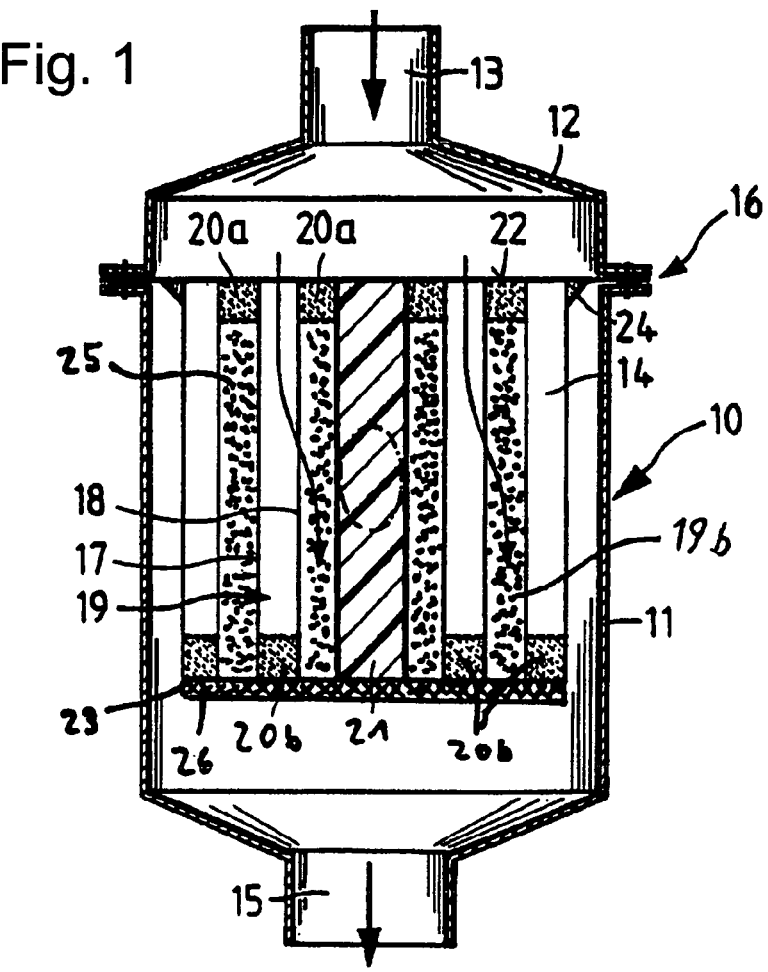
FIG. 1 is a schematic sectional view of the construction of an inline filter with a cylindrical filter element according to the invention.

An inline filter according to FIG. 1 has a housing 10 with a housing cup 11 and a lid 12. The lid has an inlet 13 through which the fluid to be filtered flows into the housing to enter a filter cartridge 14 and then flows out through an outlet 15 as indicated by the arrows. The filter cartridge 14 is fixed in a parting line 16 of the housing. Filter cartridge 14 is configured as a wound filter cartridge and is depicted schematically. Different layers 17, 18 form channels 19 through which the fluid to be filtered flows. The channels are alternately sealed by seals 20a, 20b, such that the fluid to be filtered must change channels as it flows through the filter cartridge 14. This causes the fluid to be filtered. The layers 17, 18 are furthermore sealingly wound around a core 21 which may, for example, have an oval cross section.

To produce a reliable separation between an incident flow side 22 and an discharge side 23, the filter cartridge is held in a filter frame 24. This frame is wedged into the parting line 16 of the housing. Adsorbent particles 25, in this case activated carbon chip particles, are filled into the discharge-side channels 19b and are held inside the channels 19b by a gas-permeable nonwoven fabric 26. The gas-permeable nonwoven fabric 26 is connected to the discharge-side end face of the filter cartridge 14 and has a smaller pore size than the diameter of the adsorbent particles 25. The air purified by the particles flows through the adsorbent particles 25 in the discharge-side channels 19b, such that any odors and/or gaseous pollutants contained in the air, e.g. unburned hydrocarbons, are adsorbed by the adsorbent particles 25 through which the air flows.

Figure 2:
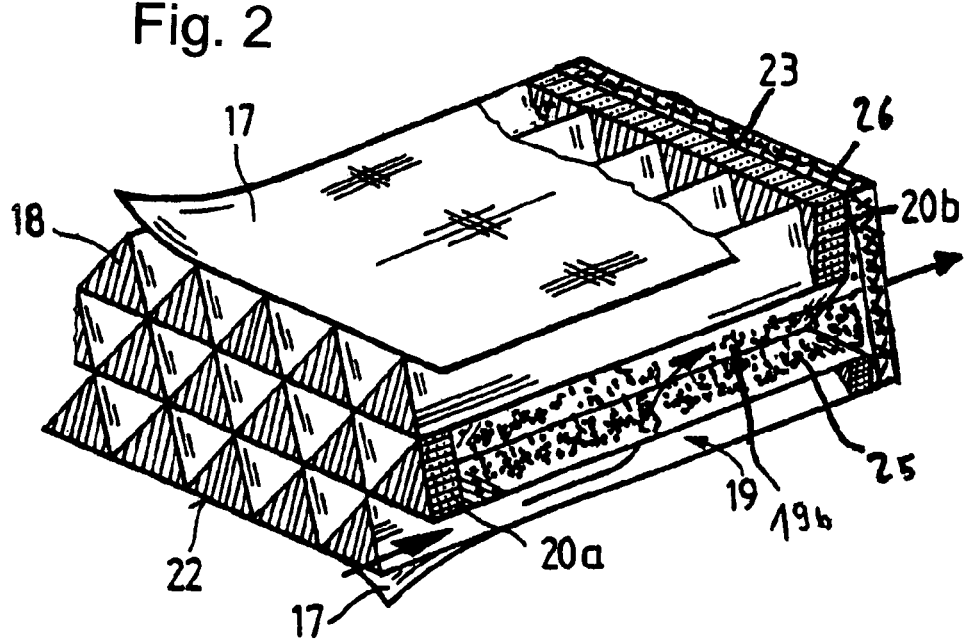
FIG. 2 is a perspective detail view of a filter element having a block-like configuration.

A detail of a stacked filter element with basically a cuboid structure is shown in FIG. 2. Components corresponding to those of FIG. 1 are identified by the same reference numerals. The cross sections of the incident flow-side channels 19 and the discharge-side channels 19b of this element are equilateral triangles. The incident flow side 22 and the discharge side 23 are alternately sealed by seals 20a, 20b, such that the fluid must take the path indicated by the arrows as it flows through the filter cartridge. The discharge-side channels 19b are again filled with adsorbent particles 25, and again in this case, the discharge side 23 is covered by a gas-permeable nonwoven fabric 26. The nonwoven fabric 26 may be connected to the discharge side 23 by bonding, welding or using any other joining method known in the art.

The filter element is formed by alternating flat layers 17 with pleated layers 18. This creates the walls of the channels. The channel walls are arranged in such a way that an incident flow-side channel has three adjacent discharge-side channels and vice versa. With the exception of the fold edges themselves, all of the available area of the filter material is thus used to filter the fluid. The so-called pinch gaps, which are created when the intermediate layers are wave-shaped, can thus be avoided entirely.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element for end face incident flow comprising:
    at least one flat layer of gas-permeable filter material alternating with at least one pleated layer of gas-permeable filter material to form channels having an open cross section, a first group of said channels being tightly sealed at one end and a second group of said channels being tightly sealed at an opposite end such that a fluid flowing through the filter from an incident flow side defined by one end face to a discharge side defined by an opposite end face must pass through one of said filter material layers to filter the fluid, and
    a seal for sealing the incident flow side from the discharge side at an installation site of the filter element, wherein each side forming the open cross section of the channels of the first group which are spaced from the periphery of the filter element is bounded by a channel of the second group such that the fluid can flow through the full area of the channels of the first group, except for the fold edges of the channels;
    at least one group of channels is filled with adsorbent particles and sealed by a gas-permeable medium disposed over the corresponding end face of the filter element, and
    the particle size of the adsorbent material is larger than the pore size of the gas-permeable medium.

2. A filter element according to claim 1, wherein said open channels have a triangular cross section.

3. A filter element according to claim 1, wherein said filter element is a passenger compartment air filter.

4. A filter element according to claim 1, wherein the filter element is essentially cylindrical in shape and is produced by rolling up at least one pleated layer and one flat layer in alternating fashion.

5. A filter element according to claim 1, wherein the filter element is produced by stacking a plurality of flat layers and pleated layers in alternating fashion.

6. A filter element according to claim 3, wherein the channels are arranged such that six adjacent channels together form a hexagonal cross section.

7. A filter element according to claim 2, wherein the channels have the cross section of equilateral triangles.

8. A filter element according to claim 1, wherein the individual layers are staggered relative to one another.

9. A filter element according to claim 1, wherein the filter element further comprises a filter frame for installation in a housing.

10. A filter element according to claim 1, further comprising a cover layer on the lateral faces connecting the two end faces of the filter element.

11. A filter element according to claim 1, wherein the adsorbent particles are spherical activated carbon particles.

12. A filter element according to claim 1, wherein the adsorbent particles are activated carbon chip particles.

13. A filter comprising a housing with an inlet and an outlet for a fluid to be filtered, and a filter element according to claim 1 installed in said housing between said inlet and said outlet.

14. A method for producing a filter element, said method comprising:
    alternately stacking at least one flat layer of fluid-permeable filter material and at least one pleated layer of fluid permeable filter material to form a plurality of parallel open channels;
    sealing a first group of channels at one end and a second group of channels at an opposite end, wherein each of the channels of the first group spaced from the periphery of the filter element is surrounded by channels of the second group;
    filling at least one group of channels with adsorbent particles, and
    covering the open ends of the filled channels with a fluid-permeable web having pores smaller than the adsorbent particles to hold the adsorbent particles in the filled channels.

15. A method according to claim 14, wherein the adsorbent particles are activated carbon chip particles.

* * * * *